(12) United States Patent
Blackwell

(10) Patent No.: US 6,951,683 B2
(45) Date of Patent: Oct. 4, 2005

(54) SYNTHETIC PAPER SKINS, PAPER AND LABELS CONTAINING THE SAME AND METHODS OF MAKING THE SAME

(75) Inventor: Christopher J. Blackwell, Willoughby, OH (US)

(73) Assignee: Avery Dennison Corporation, Pasadena, CA (US)

( * ) Notice: Subject to any disclaimer, the term of this patent is extended or adjusted under 35 U.S.C. 154(b) by 415 days.

(21) Appl. No.: 10/205,022

(22) Filed: Jul. 25, 2002

(65) Prior Publication Data

US 2003/0035944 A1 Feb. 20, 2003

Related U.S. Application Data

(60) Provisional application No. 60/308,031, filed on Jul. 25, 2001.

(51) Int. Cl.$^7$ .................. B32B 27/00; B32B 27/20; B65D 65/40
(52) U.S. Cl. .................. 428/323; 428/317.9; 428/319.7; 428/328; 428/330; 428/354; 428/516; 428/520; 524/423; 524/425; 524/445; 524/448; 524/449; 524/451; 524/492; 524/497
(58) Field of Search .................. 428/213, 317.9, 428/319.7, 323, 328, 330, 354, 349, 516, 520; 524/423, 425, 445, 448, 449, 451, 492, 497

(56) References Cited

U.S. PATENT DOCUMENTS

| | | | |
|---|---|---|---|
| 2,970,079 A | 1/1961 | Klacsmann | 162/164 |
| 3,285,766 A | 11/1966 | Barkis et al. | 117/7 |
| 3,318,721 A | 5/1967 | Lineburg | 117/15 |
| 3,340,091 A | 9/1967 | Zweig | 117/138.8 |
| 3,407,093 A | 10/1968 | Masuda | 117/201 |
| 3,790,435 A | 2/1974 | Tanba et al. | 161/160 |
| 3,799,828 A | 3/1974 | Takashi et al. | 156/229 |
| 3,916,063 A | 10/1975 | Dratz et al. | 428/341 |
| 4,064,304 A | 12/1977 | Fujita et al. | 428/207 |
| 4,086,383 A | 4/1978 | Yamano et al. | 428/174 |
| 4,092,457 A | 5/1978 | Fujita et al. | 428/341 |
| 4,340,639 A | 7/1982 | Toyoda et al. | 428/338 |
| 4,359,497 A | 11/1982 | Magder et al. | 428/141 |
| 4,420,530 A | 12/1983 | Toyoda et al. | 428/323 |
| 4,474,850 A | 10/1984 | Burwasser | 428/336 |
| 4,503,111 A | 3/1985 | Jaeger et al. | 428/195 |
| 4,550,053 A | 10/1985 | Arai et al. | 428/304.4 |
| 4,560,614 A | 12/1985 | Park | 428/317.9 |
| 4,578,285 A | 3/1986 | Viola | 427/209 |
| 4,592,954 A | 6/1986 | Malhotra | 428/335 |
| 4,650,714 A | 3/1987 | Kojima et al. | 428/341 |
| 4,698,261 A | 10/1987 | Bothe et al. | 428/204 |
| 4,705,719 A | 11/1987 | Yamanaka et al. | 428/323 |
| 4,780,364 A * | 10/1988 | Wade et al. | 428/315.5 |
| 4,857,386 A | 8/1989 | Butters et al. | 428/206 |
| 4,865,914 A | 9/1989 | Malhotra | 428/331 |
| 4,868,581 A | 9/1989 | Mouri et al. | 346/1.1 |
| 4,906,526 A | 3/1990 | Inoue et al. | 428/473.5 |
| 4,960,637 A | 10/1990 | Biczenczuk | 428/314.4 |
| 4,960,638 A | 10/1990 | Mukoyoshi et al. | 428/342 |
| 4,986,866 A * | 1/1991 | Ohba et al. | 156/220 |
| 5,006,394 A | 4/1991 | Baird | 428/138 |
| 5,047,121 A | 9/1991 | Kochar | 162/146 |
| 5,075,153 A | 12/1991 | Malhotra | 428/207 |
| 5,085,932 A | 2/1992 | Fujita et al. | 428/331 |
| 5,104,730 A | 4/1992 | Misuda et al. | 428/304.4 |
| 5,126,195 A | 6/1992 | Light | 428/327 |
| 5,204,188 A | 4/1993 | Nitta et al. | 428/476.3 |
| 5,208,093 A | 5/1993 | Carls et al. | 428/195 |
| 5,212,008 A | 5/1993 | Malhotra et al. | 428/216 |
| 5,215,817 A | 6/1993 | Chu | 428/330 |
| 5,233,924 A | 8/1993 | Ohba et al. | 101/483 |
| 5,270,103 A | 12/1993 | Oliver et al. | 428/219 |
| 5,310,591 A | 5/1994 | Dodge et al. | 428/195 |
| 5,328,748 A | 7/1994 | Westfal | 428/195 |
| 5,466,520 A | 11/1995 | Krallmann et al. | 428/323 |
| 5,494,735 A | 2/1996 | Nitta | 428/207 |
| 5,494,745 A | 2/1996 | Vander Velden et al. | 428/354 |
| 5,527,601 A | 6/1996 | Crighton et al. | 428/316.6 |
| 5,552,011 A | 9/1996 | Lin | 156/244.17 |
| 5,569,541 A | 10/1996 | Kimura et al. | 428/520 |
| 5,616,384 A * | 4/1997 | Goettmann et al. | 428/36.1 |
| 5,618,630 A | 4/1997 | Benoit et al. | 428/500 |
| 5,635,441 A | 6/1997 | Sam et al. | 503/227 |
| 5,660,919 A | 8/1997 | Vallee et al. | 428/206 |
| 5,667,872 A | 9/1997 | Ohno et al. | 428/141 |
| 5,698,333 A | 12/1997 | Benoit et al. | 428/516 |
| 5,707,722 A | 1/1998 | Iqbal et al. | 428/304.4 |
| 5,723,568 A | 3/1998 | Shimada et al. | 528/310 |
| 5,827,627 A | 10/1998 | Cleckner et al. | 430/18 |
| 5,834,098 A | 11/1998 | Kitamura et al. | 428/195 |
| 5,837,351 A | 11/1998 | Chernovitz et al. | 428/195 |
| 5,851,654 A | 12/1998 | Yoshino et al. | 428/328 |
| 5,856,010 A | 1/1999 | Furuya et al. | 428/407 |
| 5,879,494 A | 3/1999 | Hoff et al. | 156/73.3 |
| 5,908,723 A | 6/1999 | Malhotra et al. | 430/31 |
| 5,928,789 A | 7/1999 | Chen et al. | 428/413 |

(Continued)

FOREIGN PATENT DOCUMENTS

| | | |
|---|---|---|
| EP | 0 492 942 A2 | 7/1992 |
| GB | 2 177 413 A | 1/1987 |
| WO | 93/13940 | 7/1993 |
| WO | 99/58336 | 11/1999 |

OTHER PUBLICATIONS

PCT/US02/23665; PCT International Search Report mailed Dec. 18, 2002.

Primary Examiner—Daniel Zirker
(74) Attorney, Agent, or Firm—Renner, Otto, Boisselle & Sklar, LLP

(57) ABSTRACT

This invention relates to polymer film useful as a skin layer for synthetic paper or label comprising (A) a filler (B) a carrier polymer and (C) a minor amount of an ink adhesion improving polymer. The film is printable by thermal transfer printing. The invention relates to multilayer articles, which are useful as a synthetic paper or label.

38 Claims, No Drawings

U.S. PATENT DOCUMENTS

| | | | |
|---|---|---|---|
| 5,932,355 A | 8/1999 | Iqbal et al. | 428/447 |
| 5,952,104 A | 9/1999 | Sugiyama et al. | 428/409 |
| 5,969,007 A | 10/1999 | Janssens | 523/205 |
| 6,001,290 A | 12/1999 | Lin | 264/129 |
| 6,015,624 A | 1/2000 | Williams | 428/500 |
| 6,025,058 A | 2/2000 | Shepherd | 428/215 |
| 6,025,068 A | 2/2000 | Pekala | 428/315.5 |
| 6,040,042 A | 3/2000 | Dalgleish et al. | 428/308.4 |
| 6,054,218 A | 4/2000 | Nucci et al. | 428/402 |
| 6,083,443 A | 7/2000 | Eckart et al. | 264/173.14 |
| 6,086,987 A | 7/2000 | Yamanaka et al. | 428/330 |
| 6,117,537 A | 9/2000 | Butters et al. | 428/304.4 |
| 6,136,440 A | 10/2000 | Ito et al. | 428/411.1 |
| 6,150,005 A | 11/2000 | Williams et al. | 428/141 |
| 6,165,067 A | 12/2000 | Kelly | 454/370 |
| 6,171,443 B1 | 1/2001 | Goettmann et al. | 162/135 |
| 6,183,844 B1 | 2/2001 | Li | 428/212 |
| 6,200,647 B1 | 3/2001 | Emslander et al. | 427/511 |
| 6,207,761 B1 | 3/2001 | Smith et al. | 525/221 |
| 6,265,049 B1 | 7/2001 | Swisher et al. | 428/195 |
| 6,265,067 B1 | 7/2001 | Nucci et al. | 428/402 |
| 6,432,600 B2 | 8/2002 | Suwa et al. | 430/109.1 |
| 6,620,469 B2 | 9/2003 | Totani et al. | 428/32.34 |
| 6,677,005 B2 | 1/2004 | Kaneko et al. | 428/32.25 |

* cited by examiner

SYNTHETIC PAPER SKINS, PAPER AND LABELS CONTAINING THE SAME AND METHODS OF MAKING THE SAME

This application claims benefit of 60/308,031 filed Jul. 25, 2001.

FIELD OF THE INVENTION

This invention relates to a skin layer which in used in synthetic paper. The skin layer may be part of a multilayer article, which is used as synthetic paper or a synthetic label. The skin layer has low gloss, good opacity and is printable by thermal transfer printing.

BACKGROUND OF THE INVENTION

Synthetic paper is known and available as a substitute for natural papers. The synthetic paper often has desirable properties that natural paper cannot provide. Synthetic papers have been used in areas to replace natural paper. One area of trouble, however, is ink adhesion to synthetic papers. Ink can be removed easily, especially thermal transfer ink. Coatings are often added to synthetic papers to improve their ink adhesion.

Synthetic paper can be used as labels by the adding an adhesive or heat seal layer to the synthetic paper. When used as shelving labels, synthetic paper with bar codes must be able to be read optically. When the synthetic paper is too glossy, the readings are difficult or impossible to make. Shelving labels are often placed on top of the previous label. As the price of products fluctuates, labels are normally placed on the previous label. The label needs to be opaque so there are no miss readings caused by the information on the buried label.

Labels are often printed with thermal transfer printing. Thermal transfer printing uses a heated stylus that heats wax-like ink on a transfer tape. The heated ink melts and is transferred to the labels. When the ink is applied to synthetic labels, the ink does not adhere well. In fact, the print will have good appearance (easily readable and with distinct images). However, when the ink is subjected to abrasion, such as by a finger nail, the ink is smudged or actually removed.

WO 99/58336, published in the name of Glopak Inc, relates to paper like sheet of plastic material. The paper like sheet feels like and has at least some of the properties of paper.

U.S. Pat. No. 4,986,866, issued in the name of Ohba et al, relates to a process for producing synthetic label paper. This label can be used for in-mold decorating of a container.

U.S. Pat. No. 5,616,384, issued to Goettmann et al, relates to a recyclable polymeric label paper. These materials may be used in blow molded containers in-mold without the use of an adhesive material.

U.S. Pat. No. 5,667,872, issued to Ohno et al, relates to synthetic paper with multi-layer structure and excellent printing.

A need exists for a synthetic paper which are useful with thermal transfer printing. This printing must permanent and not be easily removed by abrasion.

SUMMARY OF THE INVENTION

This invention relates to polymer film useful as a skin layer for synthetic paper or label comprising (A) a filler (B) a carrier polymer and (C) a minor amount of an ink adhesion improving polymer. The film is printable by thermal transfer printing. The invention relates to multilayer articles, which are useful as a synthetic paper or label.

DETAILED DESCRIPTION

As described above, the present invention relates to skin layers and multilayer articles, which are useful as synthetic paper or label. These materials are printable, especially with thermal transfer printing. The print is durable and abrasion resistant. The skin layer and multilayer article made therefrom have a 60° gloss rating of less than about 40, or less then about 30, or less than about 25. In one embodiment, the skin layer and multilayer article have 60° ratings below about 20, or even below 18. When the synthetic paper is used as a shelf label and read by an electronic reader, the gloss of the label causes either mis-readings or non-readings caused by the light reflection on the surface of the synthetic paper or label. In one embodiment, the skin layer is free of coatings to improve ink adhesion.

In another embodiment, the skin layer and multilayer article made therefrom have good opacity. The opacity of the skin layer and multilayer article prevents and reduces mis-reading or non-readings caused by material beneath the multilayer article. This situation is typically found when labels are placed on top of each other and the information, such as the bar code data on the underneath label interferes with the scanner reading the top most labels. The present multilayer articles have a light transmission rating of greater than 75%, or greater than 80% or greater than 85% or greater than 90%. The skin layer has a matte finish.

Skin Layer

The skin layer comprises (A) a filler (B) a carrier polymer and (C) a minor amount of an ink adhesion improving polymer. The skin layer typically comprises from about 3% to about 25%, or from about 5% to about 20%, or from about 8% to about 15% of the multilayer article.

Filler

The skin layer contains a filler. The filler is typically present in an amount less then 65% by weight. In one embodiment, the filler is present in an amount from about 5% to about 50%, or from about 8% to about 45%, or from about 10% to about 40% by weight. Here and elsewhere in the specification and claims, the range and ratio limits may be combined. Combinations of fillers may be used. When a combination of fillers is used, there combined amount is reflected in the above percentages. The filler includes calcium carbonate, titanium dioxide, clay, diatomaceous earth, talc, mica, barium sulfate, aluminum sulfate, silica, or mixtures of two of more thereof. Specific examples of the amounts of the individual fillers is given below. The amounts are parts by weight.

| Filler | Amounts |
|---|---|
| Titanium dioxide | about 5–50, or about 10–40, or about 15–30 |
| Talc | about 5–50, or about 10–40, or about 15–30 |
| Mica | about 5–50, or about 10–40, or about 15–30 |
| Calcium carbonate | about 5–65, or about 10–55, or about 15–40 |

In another embodiment, a useful filler combination includes an anti-blocking agent, which is chosen depending on the conditions prevailing in the extruder, silica, talc, diatomaceous earth, and any mixtures thereof. The finely divided substantially water-insoluble filler particles may be finely divided substantially water-insoluble inorganic filler particles.

The finely divided substantially water-insoluble inorganic filler particles include particles of metal oxides. The metal oxide constituting the particles may be a simple metal oxide (i.e., the oxide of a single metal) or it may be a complex metal oxide (i.e., the oxide of two or more metals). The particles of metal oxide may be particles of a single metal oxide or they may be a mixture of different particles of different metal oxides.

Examples of suitable metal oxides include alumina, silica, and titania. Other oxides may optionally be present in minor amount. Examples of such optional oxides include, but are not limited to, zirconia, hafnia, and yttria. Other metal oxides that may optionally be present are those which are ordinarily present as impurities such as for example, iron oxide. For purposes of the present specification and claims, silicon is considered to be a metal.

When the particles are particles of alumina, most often the alumina is alumina monohydroxide. Particles of alumina monohydroxide, AlO(OH), and their preparation are known. The preparation and properties of alumina monohydroxide are described by B. E. Yoldas in The American Ceramic Society Bulletin, Vol. 54, No. 3, (March 1975), pages 289–290, in Journal of Applied Chemical Biotechnology, Vol. 23 (1973), pages 803–809, and in Journal of Materials Science, Vol. 10 (1975), pages 1856–1860. Briefly, aluminum isopropoxide or aluminum secondary-butoxide are hydrolyzed in an excess of water with vigorous agitation at from 75° C. to 80° C. to form a slurry of aluminum monohydroxide. The aluminum monohydroxide is then peptized at temperatures of at least 80° C. with an acid to form a clear alumina monohydroxide sol which exhibits the Tyndall effect when illuminated with a narrow beam of light. Since the alumina monohydroxide of the sol is neither white nor colored, it is not a pigment and does not function as a pigment in the present invention. The acid employed is noncomplexing with aluminum, and it has sufficient strength to produce the required charge effect at low concentration. Nitric acid, hydrochloric acid, perchloric acid, acetic acid, chloroacetic acid, and formic acid meet these requirements. The acid concentration is usually in the range of from 0.03 to 0.1 mole of acid per mole of aluminum alkoxide. Although it is desired not to be bound by any theory, it is believed that the alumina monohydroxide produced in this manner is pseudo-boehmite. Pseudo-boehmite is indeed the preferred alumina monohydroxide for use in the present invention. The alumina monohydroxide is not a pigment and does not function as a pigment in the present invention. In most instances the alumina monohydroxide is transparent and colorless.

Colloidal silica is also known. Its preparation and properties are described by R. K. Iler in The Chemistry of Silica, John Wiley & Sons, Inc., New York (1979) ISBN 0-471-02404-X, pages 312–337, and in U.S. Pat. Nos. 2,601,235; 2,614,993; 2,614,994; 2,617,995; 2,631,134; 2,885,366; and 2,951,044, the disclosures of which are, in their entireties, incorporated herein by reference. Examples of commercially available colloidal silica include Ludox® HS, LS, SM, TM and CL-X colloidal silica (E. I. du Pont de Nemours & Company, Inc.) in which the counter ion is the sodium ion, and Ludox® AS colloidal silica (E. I. du Pont de Nemours & Company, Inc.) in which the counter ion is the ammonium ion. Another example is Ludox® AM colloidal silica (E. I. du Pont de Nemours & Company, Inc.) in which some of the silicon atoms have been replaced by aluminum atoms and the counter ion is the sodium ion.

Colloidal titania is also known. Its preparation and properties are described in U.S. Pat. No. 4,275,118. Colloidal titania may also be prepared by reacting titanium isopropoxide [CAS 546-68-9] with water and tetramethyl ammonium hydroxide.

The filler particles usually have a maximum dimension of less than 500 nanometers. Often the filler particles have a maximum dimension of less than 100 nanometers. Frequently, the maximum dimension is less than 50, or less than 20 nanometers.

Carrier Resin

The skin layer has a carrier resin. This resin typically comprises about from about 8% to about 65%, or from about 10% to about 50%, or from about 15% to about 45% by weight of the skin layer. The carrier resins include a polyolefin, thermoplastic polymers of ethylene and propylene, a polyester, a polycarbonate, a styrene derived polymer, a polyurethane, a polyacryl, a polymethacryl, a polyvinyl alcohol, a polyamide, a polyimide, a polysulfone, a polymethylpentene, a polyacetal, a vinyl halide derived polymer, a poly(ethylene vinyl alcohol), a vinyl acetate derived polymer, an ionomer, and mixtures thereof.

In one embodiment, the carrier resin is a polyolefin. The polyolefins which can be utilized as the carrier resin include polymers and copolymers of ethylene, propylene, 1-butene, hexene, octene etc., or blends of mixtures of such polymers and copolymers. In one embodiment, the polyolefins comprise polymers and copolymers of ethylene and propylene. In another embodiment, the polyolefins comprise propylene homopolymers, and copolymers such as propylene-ethylene and propylene-1-butene copolymers. Blends of polypropylene and polyethylene with each other, or blends of either or both of them with polypropylene-polyethylene copolymer also are useful. In another embodiment, the polyolefin film materials are those with a very high propylenic content, either polypropylene homopolymer or propylene-ethylene copolymers or blends of polypropylene and polyethylene with low ethylene content, or propylene-1-butene copolymers or blend of polypropylene and poly-1-butene with low butene content.

Various polyethylenes can be utilized as the first polymer material including low, medium, and high density polyethylenes. An example of a useful low density polyethylene (LDPE) is Rexene 1017 available from Huntsman.

The propylene homopolymers which can be utilized as the first polymer material in the constructions of the invention, either alone, or in combination with a propylene copolymer as described herein, include a variety of propylene homopolymers such as those having melt flow rates (MFR) from about 0.5 to about 20 as determined by ASTM Test D 1238, condition L. A number of useful propylene homopolymers are available commercially from a variety of sources, and some useful polymers include: 5A97, available from Union Carbide and having a melt flow of 3.9 g/10 min and a density of 0.90 g/cm3; DX5E66, also available from Union Carbide and having an MFI of 8.8 g/10 min and a density of 0.90 g/cm3; and WRD5-1057 from Union Carbide having an MFI of 3.9 g/10 min and a density of 0.90 g/cm3. Useful commercial propylene homopolymers are also available from Ato Fina and Montel.

A variety of propylene copolymers are available and useful in the invention. The propylene copolymers generally comprise copolymers of propylene and up to 10% or even 20% by weight of at least one other alpha olefin such as ethylene, 1-butene, 1-pentene, etc. In one embodiment, the propylene copolymers are propylene-ethylene copolymers with ethylenic contents with from about 0.2% to about 10% by weight. Such copolymers are prepared by techniques well known to those skilled in the art, and these copolymers are available commercially from, for example, Union Carbide. A propylene-ethylene copolymer containing about 3.2% by weight of ethylene is available from Union Carbide under the designation DS6D20. Another Union Carbide propylene-ethylene copolymer is DS6D81, which contains 5.5% by weight of ethylene.

In another embodiment, the carrier resin comprises at least one thermoplastic copolymer or terpolymer derived from ethylene or propylene and a functional monomer selected from the group consisting of alkyl acrylate, acrylic acid, alkyl acrylic acid, and combinations of two or more thereof. In one embodiment, the functional monomer is selected from alkyl acrylate, acrylic acid, alkyl acrylic acid, and combinations of two ore more thereof. In one embodiment, the first polymer is characterized by the absence of ethylene vinyl acetate resins, and acid or acid/acrylate-modified ethylene vinyl acetate resins. The alkyl groups in the alkyl acrylates and the alkyl acrylic acids typically contain 1 to about 8 carbon atoms, and, in one embodiment, 1 to about 2 carbon atoms. The functional monomer(s) component of the copolymer or terpolymer ranges from about 1 to about 15 mole percent, and, in one embodiment, about 1 to about 10 mole percent of the copolymer or terpolymer molecule. Examples include: ethylene/methyl acrylate copolymers; ethylene/ethylacrylate copolymers; ethylene/butyl acrylate copolymers; ethylene/methacrylic acid copolymers; ethylene/acrylic acid copolymers; anhydride-modified low density polyethylenes; anhydride-modified linear low density polyethylene, and mixtures of two or more thereof.

Ethylene acid copolymers are available from DuPont under the tradename Nucrel can also be used. These include Nucrel 0407, which has a methacrylic acid content of 4% by weight and a melting point of 109° C., and Nucrel 0910, which has a methacrylic acid content of 8.7% by weight and a melting point of 100° C. The ethylene/acrylic acid copolymers available from Dow Chemical under the tradename Primacor are also useful. These include Primacor 1430, which has an acrylic acid monomer content of 9.5% by weight, a melting point of about 97° C. and a Tg of about −7.7° C. The ethylene/methyl acrylate copolymers available from Chevron under the tradename EMAC can be used. These include EMAC 2205, which has a methyl acrylate content of 20% by weight and a melting point of 83° C., and EMAC 2268, which has a methyl acrylate content of 24% by weight, a melting point of about 74° C. and a Tg of about −40.6° C.

In one embodiment, the carrier resin comprises at least one polyester. Polyesters are prepared from various glycols (including ethylene glycol, propylene glycol, neopentyl glycol, etc.) or polyols (glycerol, trimethylolpropane, pentaeythritol, etc.) and one or more aliphatic or aromatic carboxylic acids. Polyethylene terephthalate (PET), PETG (PET modified with cyclohexanedimethanol), and polybutylene terephthalate (PBT) are useful and are available from a variety of commercial sources including Eastman. For example, Kodar 6763 is a PETG available from Eastman Chemical. Another useful polyester from duPont is Selar PT-8307 which is polyethylene terephthalate. Another useful polyester is polyethylene naphthanate.

Particularly useful polyamide resins include resins available from EMS American Grilon Inc., Sumter, S.C. under the general tradename Grivory such as CF6S, CR-9, XE3303 and G-21. Grivory G-21 is an amorphous nylon copolymer having a glass transition temperature of 125° C., a melt flow index (DIN 53735) of 90 ml/10 min and an elongation at break (ASTM D638) of 15. Grivory CF65 is a nylon 6/12 film grade resin having a melting point of 135° C., a melt flow index of 50 ml/10 min, and an elongation at break in excess of 350%. Grilon CR9 is another nylon 6/12 film grade resin having a melting point of 200° C., a melt flow index of 200 ml/10 min, and an elongation at break at 250%. Grilon XE 3303 is a nylon 6.6/6.10 film grade resin having a melting point of 200° C., a melt flow index of 60 ml/10 min, and an elongation at break of 100%. Other useful polyamide resins include those commercially available from, for example, Union Camp of Wayne, N.J. under the Uni-Rez product line, and dimer-based polyamide resins available from Bostik, Emery, Fuller, Henkel (under the Versamid product line). Other suitable polyamides include those produced by condensing dimerized vegetable acids with hexamethylene diamine. Examples of polyamides available from Union Camp include Uni-Rez 2665; Uni-Rez 2620; Uni-Rez 2623; and Uni-Rez 2695. In one embodiment, the carrier resin comprises at least one polyimide. Examples of a polyimide films include NOVAU polyimide available from Mitsubishi Chemical Industries Ltd. of Tokyo, Japan and KAPTON polyimide, available from Du Pont Electronics of Wilmington, Del.

In another embodiment, the carrier resin comprises at least one polystyrene. Polystyrenes include homopolymers as well as copolymers of styrene and substituted styrene, such as alpha-methyl styrene. Examples of styrene copolymers and terpolymers include: acrylonitrile-butene-styrene (ABS); styrene-acrylonitrile copolymers (SAN); styrene butadiene (SB); styrene-maleic anhydride (SMA); and styrene-methyl methacrylate (SMMA); etc. An example of a useful styrene copolymer is KR-10 from Phillip Petroleum Co. KR-10 is believed to be a copolymer of styrene with 1,3-butadiene.

In one embodiment, the carrier resin is at least one polyurethane. The polyurethanes include aliphatic as well as aromatic polyurethanes. The polyurethane is typically the reaction products of the following components: (A) a polyisocyanate having at least two isocyanate (—NCO) functionalities per molecule with (B) at least one isocyanate reactive group, such as a polyol having at least two hydroxy groups or an amine. Suitable polyisocyanates include diisocyanate monomers, and oligomers.

Useful polyurethanes include aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. Particularly useful polyurethanes include aromatic polyether polyurethanes, aliphatic polyether polyurethanes, aromatic polyester polyurethanes, and aliphatic polyester polyurethanes.

Examples of commercial polyurethanes include Sancure 2710® and/or Avalure UR 445® (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure 878®, Sancure 815®, Sancure 1301®, Sancure 2715®, Sancure 1828®, Sancure 2026®, Sancure 1818®, Sancure 853®, Sancure 830®, Sancure 825®, Sancure 776®, Sancure 850®, Sancure 12140®, Sancure 12619®, Sancure 835®, Sancure 843®, Sancure 898®, Sancure 899®, Sancure 1511®, Sancure 1514®, Sancure 1517®, Sancure 1591®, Sancure 2255®, Sancure 2260®, Sancure 2310®, Sancure 2725®, and Sancure 12471® (all of which are commercially available from BFGoodrich, Cleveland, Ohio), Bayhydrol DLN (commercially available from Bayer Corp., McMurray, Pa.), Bayhydrol LS-2033 (Bayer Corp.), Bayhydrol 123 (Bayer Corp.), Bayhydrol PU402A (Bayer Corp.), Bayhydrol 110 (Bayer Corp.), Witcobond W-320 (commercially available from Witco Performance Chemicals), Witcobond W-242 (Witco Performance Chemicals), Witcobond W-160 (Witco Performance Chemicals), Witcobond W-612 (Witco Performance Chemicals), Witcobond W-506 (Witco Performance Chemicals), NeoRez R-600 (a polytetramethylene ether urethane extended with isophorone diamine commercially available from Avecia, formerly Avecia Resins), NeoRez R-940 (Avecia Resins), NeoRez R-960 (Avecia Resins), NeoRez R-962 (Avecia Resins), NeoRez R-966 (Avecia Resins), NeoRez R-967 (Avecia Resins), NeoRez R-972 (Avecia Resins), NeoRez R-9409 (Avecia Resins), NeoRez R-9637 (Avecia), NeoRez R-9649 (Avecia Resins), and NeoRez R-9679 (Avecia Resins).

Particularly useful polyurethanes are aliphatic polyether polyurethanes. Examples of such aliphatic polyether polyurethanes include Sancure 2710® and/or Avalure UR 445®, Sancure 878®, NeoRez R-600, NeoRez R-966, NeoRez R-967, and Witcobond W-320.

In one embodiment, the carrier resin comprises at least one polyester polyurethane. Examples of these carrier resin include those sold under the names "Sancure 2060" (polyester-polyurethane), "Sancure 2255" (polyester-polyurethane), "Sancure 815" (polyester-polyurethane), "Sancure 878" (polyether-polyurethane) and "Sancure 861" (polyether-polyurethane) by the company Sanncor, under the names "Neorez R-974" (polyester-polyurethane), "Neorez R-981" (polyester-polyurethane) and "Neorez R-970" (polyether-polyurethane) by the company ICI, and the acrylic copolymer dispersion sold under the name "Neocryl XK-90" by the company Avecia.

In another embodiment, the carrier resin is a polyacryl or polymethacryl resin. As used herein, a "polyacryl" includes polyacrylates, polyacrylics, or polyacrylamides, and "polymethacryl" includes polymethacrylates, polymethacrylics, or polymethacrylamides. These resins includes those derived from acrylic acid, acrylate esters, acrylamide, methacrylic acid, methacrylate esters, and methacrylamide. The acrylate and methacrylate ester generally contain from 1 to about 30 carbon atoms in the pendant group, or from 1 to about 18, or from 2 to about 12 carbon atoms in the pendant group.

Examples of commercial polyacryls and polymethacryls include Gelva® 2497 (commercially available from Monsanto Co., St. Louis, Mo.), Duraplus® 2 (commercially available from Rohm & Haas Co., Philadelphia, Pa.), Joncryl® 95 (commercially available from S.C. Johnson Polymer, Sturtevant, Wis.), SCX-1537 (S.C. Johnson Polymer), SCX-1959 (S.C. Johnson Polymer), SCX-1965 (S.C. Johnson Polymer), Joncryl® 530 (S.C. Johnson Polymer), Joncryl® 537 (S.C. Johnson Polymer), Glascol LS20 (commercially available from Allied Colloids, Suffolk, Va.), Glascol C37 (Allied Colloids), Glascol LS26 (Allied Colloids), Glascol LS24 (Allied Colloids), Glascol LE45 (Allied Colloids), Carboset® CR760 (commercially available from BFGoodrich, Cleveland, Ohio), Carboset® CR761 (BFGoodrich), Carboset® CR763 (BFGoodrich), Carboset® 765 (BFGoodrich), Carboset® 19X2 (BFGoodrich), Carboset® XL28 (BFGoodrich), Hycar 26084 (BFGoodrich), Hycar 26091 (BFGoodrich), Carbobond 26373 (BFGoodrich), Neocryl® A-601 (commercially available from Avecia Resins, Wilmington, Mass.)Neocryl® A-612 (Avecia Resins), Neocryl® A-6044 (Avecia Resins), Neocryl® A-622 (Avecia Resins), Neocryl® A-623 (Avecia Resins), Neocryl® A-634 (Avecia Resins), and Neocryl® A-640 (Avecia Resins).

Polycarbonates also are useful in the carrier resin. These polycarbonates are available from the Dow Chemical Co. (Calibre) G.E. Plastics (Lexan) and Bayer (Makrolon). Most commercial polycarbonates are obtained by the reaction of bisphenol A and carbonyl chloride in an interfacial process. Molecular weights of the typical commercial polycarbonates vary from about 22,000 to about 35,000, and the melt flow rates generally are in the range of from 4 to 22 g/10 min.

In another embodiment, the carrier resin is a vinyl halide derived resin. These are typically vinyl halide chloride derived resins, which are sometimes referred to herein as PVC resins. These resins are well known and are either homopolymers of vinyl chloride or copolymers of vinyl chloride with a minor amount by weight of one or more ethylenically-unsaturated comonomers which are copolymerizable with the vinyl chloride. Examples of these ethylenically-unsaturated comonomers include vinyl halides, such as vinyl fluoride and vinyl bromide; alpha-olefins, such as ethylene, propylene and butylene; vinyl esters, such as vinyl acetate, vinyl propionate, vinyl butyrate and vinyl hexanoate, or partially hydrolyzed products thereof, such as vinyl alcohol; vinyl ethers, such as methyl vinyl ether, propyl vinyl ether and butyl vinyl ether; acrylic esters, such as methyl acrylate, ethyl acrylate, methyl methacrylate and butyl methacrylate and other monomers, such as acrylonitrile, vinylidene chloride and dibutyl maleate. Such resins are generally known any many are commercially available. A particularly useful polyvinylchloride resin is the homopolymer of vinyl chloride.

Examples of polyvinylchloride resins that are commercially available include GEON 92, a medium high molecular weight porous suspension PVC resin; GEON 128, a high molecular weight dispersion grade polyvinylchloride resin; and GEON 11X426FG, a medium molecular weight PVC resin. The GEON resins are available from the Geon Company. The number average molecular weights of the PVC resins useful in the present invention may range from about 20,000 up to about 80,000, and a typical range of about 40,000 to about 60,000.

In another embodiment, the polymeric core comprises at least one ionomer. Ionomers are polyolefins containing ionic bonding of molecular chains. Ionomer resins available from DuPont under the tradename Surlyn can also be used. These are identified as being derived from sodium, lithium or zinc and copolymers of ethylene and methacrylic acid. These include Surlyn 1601, which is a sodium containing ionomer having a melting point of 98° C., Surlyn 1605, which is a sodium containing ionomer having a melting point of about 90° C. and a Tg of about −20.6° C., Surlyn 1650, which is a zinc containing ionomer having a melting point of 97° C., Surlyn 1652 which is a zinc containing ionomer having a melting point of 197° C., Surlyn 1702, which is a zinc containing ionomer having a melting point of 93° C., Surlyn 1705-1, which is a zinc containing ionomer having a melting point of 95° C., Surlyn 1707, which is a sodium containing ionomer having a melting point of 95° C., Surlyn 1802, which is a sodium containing ionomer having a melting point of 99° C., Surlyn 1855, which is a zinc containing ionomer having a melting point of 88° C., Surlyn 1857, which is a zinc containing ionomer having a melting point of 87° C., and Surlyn 1901, which is a sodium containing ionomer having a melting point of 95° C.

Adhesion Improving Resin

The skin layer also comprises an ink adhesion improving polymer. This polymer is typically a non-polar or slightly polar polymer. By polar polymer it is meant a basically hydrocarbon polymer containing polar additives. Polar additives are those containing oxygen, sulfur, nitrogen, etc. The polarity of the polymer is typically provided by copolymerizing a hydrocarbon monomer and a polar comonomer. The polar comonomer will general compose less than about 35%, or less than 30%, or less than 25% by molar amount of the monomers used to prepare the ink adhesion promoting polymer. In another embodiment, the polar comonomer comprises less than 20%, or less than 15% by molar amount of the ink adhesion promoting resin. In another embodiment, the ink adhesion promoting polymer is non-polar, i.e. hydrocarbon.

The ink adhesion promoting polymers typically have a melting point of less than 170, or less than about 150, or less than 125, or less than 110, or less than about 95 degrees Celsius. The ink adhesion promoting polymers also generally gave densities of less then 0.97, or less than about 0.92, or less than about 0.89 g/cc. The resin is generally present in an amount less than 50% by weight of the skin layer. The carrier resin is typically present in an amount from about 5% to about 48%, or from about 8% to about 45%, or from 10% to about 40% by weight of the skin layer. The ink adhesion promoting polymer may include a polyolefin, thermoplastic polymers of ethylene and propylene, a polyurethane, a polyvinyl alcohol, a vinyl acetate homopolymer, co- or terpolymer, an ionomer, and mixtures thereof. These polymers have been described above.

In one embodiment, the polymer is a polyolefin or a thermoplastic polymer of ethylene or propylene, or mixture containing these polymers. In another embodiment, the polymer is polyethylene, polypropylene, thermoplastic polymers of ethylene or propylene. Useful polyolefins include very low density polyethylene (ULDPE), which has been referred to as ultra low density polyethylene, linear low density polyethylene (LLDPE), linear low density polyethylene (LLPE), etc. Very low density polyethylene (VLDPE) has a density of about 0.890–0.912. An example of VLDPE is a 88 g of low-density polyethylene (product of Union Polymer Corp., low-density polyethylene 339 (trade name)).

In one embodiment, the ink adhesion promoting polymer is an "ethylene/alpha-olefin copolymer." These polymers generally designate copolymers of ethylene with one or more comonomers, such as 1-butene, 1-pentene, 1-hexene, 1-octene, methyl pentene and the like, in which the polymer molecules comprise long chains with relatively few side chain branches. These polymers are obtained by low pressure polymerization processes and the side branching which is present will be short compared to non-linear polyethylenes (e.g., LDPE, a low density polyethylene homopolymer). Ethylene/alpha-olefin copolymers generally have a density in the range of from about 0.86 g/cc to about 0.94 g/cc. The term linear low density polyethylene (LLDPE) is generally understood to include that group of ethylene/alpha-olefin copolymers which fall into the density range of about 0.915 to about 0.94 g/cc. Sometimes linear polyethylene in the density range from about 0.926 to about 0.94 is referred to as linear medium density polyethylene (LMDPE). Lower density ethylene/alpha-olefin copolymers may be referred to as very low density polyethylene (VLDPE, typically used to refer to the ethylene/butene copolymers available from Union Carbide with a density ranging from about 0.88 to about 0.91 g/cc) and ultra-low density polyethylene (ULDPE, typically used to refer to the ethylene/octene copolymers supplied by Dow). Specific examples of commercially available useful low density ethylene-1-octene copolymers include: Dowlex 2036A with a density in the range of 0.9330 to 0.9370; Dowlex 2032PER with a density of 0.9240 to 9280; Affinity PF1140 with a density of 0.895 to 0.898; Affinity VP8770 with a density of 0.885; Attane 4402 with a density of 0.912; and Attane 4401 with a density of 0.912. All of these copolymers are available from the Dow Chemical Co.

The skin layer is made by means know to those in the art. The ingredients are typically extruded to form a polymeric film. In one embodiment, the skin layer may be prepared from commercially available synthetic paper concentrates. These concentrates are known to those in the art and include Papermatcha synthetic paper concentrates available commercially from A. Schulman. Another useful concentrate is available from Ampacet Corporation. When using the concentrates, the ink adhesion improving polymer is added to the concentrates at the levels indicated above.

The following examples relate to skin formulation which are useful in preparing synthetic resins. In the following example and elsewhere in the specification and claims, unless the context clearly indicates otherwise, the amounts are by weight, the temperature is in degrees Celsius and the pressure is atmospheric pressure.

|  | 1 | 2 | 3 | 4 | 5 | 6 | 7 | 8 |
|---|---|---|---|---|---|---|---|---|
| VLDPE | — | — | 45 | — | 30 | 25 | — | 35 |
| LLDPE | — | 25 | — | — | — | — | — | — |
| HDPE | 20 | — | — | — | — | 45 | — | — |
| PP[a] | — | 25 | — | 45 | — | — | — | — |
| CoPP (3.7% ethylene) | 30 | — | 25 | — | — | — | 40 | — |
| CaCO$_3$ | 30 | 35 | 20 | — | — | 15 | — | — |
| TiO$_2$ | 20 | — | 10 | — | — | 12 | — | — |
| Mica | — | 15 | — | — | — | 3 | — | — |
| Papermatch | — | — | — | 55 | 70 | — | 60 | 65 |

[a]WRD5-1057 polypropylene from Union Carbide

Multilayer Articles

In another embodiment, the invention relates to a multilayer article useful as a synthetic paper or label. The multilayer article comprising a polymeric core layer having at least one skin layer, wherein the skin layer comprises (A) a filler (B) a carrier polymer and (C) a minor amount of an ink adhesion improving polymer. The multilayer article typically has a thickness of about 1 to about 15, or of about 1.5 to about 10, or of about 2 to about 6 mils.

The polymeric core may be a single polymer or blend of polymers. The polymeric core may be a single layer or multiple layers. The polymeric core may be extruded, or either coextruded or laminated together for multilayer structures. The polymeric core may be clear or colored, such as light colors including white, yellow, and beige. The core layer typically has a thickness from about 60% to about 95%, or from about 65% to about 90%, or from about 70% to about 85% or the thickness of the multilayer article. The core is typically the major portion of the multilayer article. The core typically constitutes greater than 60%, or greater that 65%, or greater than 70%, or greater than 75% of the thickness of the multilayer article. The skin layer composes the balance of the multilayer article. The core layer typically has a thickness from about 0.1 to about 10 mils, or from about 0.3 to about 5, or from about 0.5 to about 2.5 mils.

The core layer is comprised of at least one polymer. The polymers include those described above for the skin layer. Polyolefins and thermoplastic polymers of ethylene and propylene are particularly useful.

The polymeric core material may contain inorganic fillers and other organic or inorganic additives to provide desired properties such as appearance properties (opaque or colored films), durability and processing characteristics. Nucleating agents can be added to increase crystallinity and thereby increase stiffness. Examples of useful materials include calcium carbonate, titanium dioxide, metal particles, fibers, flame retardants, antioxidant compounds, heat stabilizers, light stabilizers, ultraviolet light stabilizers, antiblocking agents, processing aids, acid aceptors, etc.

The core layer may be directly laminated to the skin layer. This structure would be those prepared by extrusion means. Alternatively the core layer can be laminated to the skin layer through a tie layer or an adhesive layer. The adhesives, could be any of those discussed below. The tie layer acts at an adhesion promoting layer. The tie layer is typically an adhesive material. The adhesive material may be comprised of an adhesive resin such as ethylene/vinyl acetate copolymer. These include DuPont Elvax 3170 and 3190LG. The adhesive resins available from DuPont under the tradename Bynel can also be used.

In another embodiment, the multilayer structure includes a second skin layer. This skin layer may be prepared from the polymers described for ink adhesion promoting polymer. The second skin layer is on the other surface of the core layer, i.e. opposite surface than the ink adhesion promoting polymer. The second skin may be adhesive or non-adhesive. The second skin layer typically has a thickness on the order of the first skin layer. Although their thicknesses do not need to be identical, they often are the same thickness.

In one embodiment, the second skin layer is an adhesive layer. The adhesive may be a heat-activated adhesive, a hot melt adhesive, or a pressure sensitive adhesive (PSA). The adhesives may generally be classified into the following categories: 1) Random copolymer adhesives, such as those based upon acrylate and/or methacrylate copolymers, a-olefin copolymers, silicone copolymers, chloroprene/acrylonitrile copolymers, and the like, 2) Block copolymer adhesives, including those based upon linear block copolymers (i.e., A-B and A-B-A type), branched block copolymers, star block copolymers, grafted or radial block copolymers, and the like, and 3) Natural and synthetic rubber adhesives. A description of useful adhesives may be found in Encyclopedia of Polymer Science and Engineering, Vol. 13. Wiley-Interscience Publishers (New York, 1988). Additional description of useful adhesives may be found in Encyclopedia of Polymer Science and Technology, Vol. 1, Interscience Publishers (New York, 1964).

Commercially available pressure-sensitive adhesives are useful in the invention. Examples of these adhesives include the hot melt pressure-sensitive adhesives available from H. B. Fuller Company, St. Paul, Minn. as HM-1597, HL-2207-X, HL-2115X, HL-2193-X. Other useful commercially available pressure-sensitive adhesives include those available from Century Adhesives Corporation, Columbus, Ohio.

Conventional PSAs, including silicone-based PSAs, rubber-based PSAs, and acrylic-based PSAs are useful. Another commercial example of a hot melt adhesive is H2187-01, sold by Ato Findley, Inc., of Wauwatusa, Wis. In addition, rubber based block copolymer PSAs described in U.S. Pat. No. 3,239,478 (Harlan) also can be utilized in the coextruded adhesive constructions of the present invention, and this patent is hereby incorporated by a reference for its disclosure of such hot melt adhesives.

In one embodiment, the pressure sensitive adhesive utilized in the present invention comprise rubber based elastomer materials such as linear, branched, grafted, or radial block copolymers represented by the diblock structures A-B, the triblock A-B-A, the radial or coupled structures (A-B)n, and combinations of these where A represents a hard thermoplastic phase or block which is non-rubbery or glassy or crystalline at room temperature but fluid at higher temperatures, and B represents a soft block which is rubbery or elastomeric at service or room temperature. These thermoplastic elastomers may comprise from about 75% to about 95% by weight of rubbery segments and from about 5% to about 25% by weight of non-rubbery segments.

The non-rubbery segments or hard blocks comprise polymers of mono- and polycyclic aromatic hydrocarbons, and more particularly vinyl-substituted aromatic hydrocarbons which may be monocyclic or bicyclic in nature. The preferred rubbery blocks or segments are polymer blocks of homopolymers or copolymers of aliphatic conjugated dienes. Rubbery materials such as polyisoprene, polybutadiene, and styrene butadiene rubbers may be used to form the rubbery block or segment. Particularly preferred rubbery segments include polydienes and saturated olefin rubbers of ethylene/butylene or ethylene/propylene copolymers. The latter rubbers may be obtained from the corresponding unsaturated polyalkylene moieties such as polybutadiene and polyisoprene by hydrogenation thereof.

The block copolymers of vinyl aromatic hydrocarbons and conjugated dienes which may be utilized include any of those which exhibit elastomeric properties. The block copolymers may be diblock, triblock, multiblock, starblock, polyblock or graftblock copolymers. Throughout this specification and claims, the terms diblock, triblock, multiblock, polyblock, and graft or grafted-block with respect to the structural features of block copolymers are to be given their normal meaning as defined in the literature such as in the Encyclopedia of Polymer Science and Engineering, Vol. 2, (1985) John Wiley & Sons, Inc., New York, pp. 325–326, and by J. E. McGrath in Block Copolymers, Science Technology, Dale J. Meier, Ed., Harwood Academic Publishers, 1979, at pages 1–5.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390, 207; 3,598,887; and 4,219,627. As well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes also may be used. The preferred conjugated dienes are isoprene and 1,3-butadiene.

Examples of vinyl aromatic hydrocarbons which may be utilized to prepare the copolymers include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene, etc. The preferred vinyl aromatic hydrocarbon is styrene.

Many of the above-described copolymers of conjugated dienes and vinyl aromatic compounds are commercially available. The number average molecular weight of the block copolymers, prior to hydrogenation, is from about 20,000 to about 500,000, preferably from about 40,000 to about 300,000.

The average molecular weights of the individual blocks within the copolymers may vary within certain limits. In most instances, the vinyl aromatic block will have a number average molecular weight in the order of about 2000 to about 125,000, and preferably between about 4000 and 60,000. The conjugated diene blocks either before or after hydrogenation will have number average molecular weights in the order of about 10,000 to about 450,000 and more preferably from about 35,000 to 150,000.

Also, prior to hydrogenation, the vinyl content of the conjugated diene portion generally is from about 10% to about 80%, and the vinyl content is preferably from about 25% to about 65%, particularly 35% to 55% when it is desired that the modified block copolymer exhibit rubbery elasticity. The vinyl content of the block copolymer can be measured by means of nuclear magnetic resonance.

Specific examples of diblock copolymers include styrene butadiene (SB), styrene-isoprene (SI), and the hydrogenated derivatives thereof. Examples of triblock polymers include styrene-butadiene-styrene (SBS), styrene-isoprene-styrene (SIS), alpha-methylstyrene-butad iene-alpha-methylstyrene, and alpha-methylstyrene-isoprene alpha-methylstyrene. Examples of commercially available block copolymers useful as the adhesives include those available from Shell Chemical Company under the tradename Kraton polymers and specific examples include D1101, D1107P, D1111, D1112P, D1113P, D1117P, and D1320X. Vector 4111 is a SIS block copolymer available from Dexco of Houston, Tex.

Upon hydrogenation of the SBS copolymers comprising a rubbery segment of a mixture of 1,4 and 1,2 isomers, a styrene-ethylene-butylene styrene (SEBS) block copolymer is obtained. Similarly, hydrogenation of an SIS polymer yields a styrene-ethylene propylene-styrene (SEPS) block copolymer. The polymer and procedures for their preparation are described in U.S. Pat. Nos. 3,113,986 and 4,226,952, the disclosures of which are incorporated herein by reference.

A number of selectively hydrogenated block copolymers are available commercially from Shell Chemical Company under the general trade designation "Kraton G." One example is Kraton G1652 which is a hydrogenated SBS triblock comprising about 30% by weight of styrene end blocks and a midblock which is a copolymer of ethylene and 1-butene (EB). A lower molecular weight version of G1652 is available from Shell under the designation Kraton G1650. Kraton G1651 is another SEBS block copolymer which contains about 33% by weight of styrene. Kraton G1657 is an SEBS diblock copolymer which contains about 13%w styrene. This styrene content is lower than the styrene content in Kraton G1650 and Kraton G1652.

The block copolymers may also include functionalized polymers such as may be obtained by reacting an alpha, beta-olefinically unsaturated monocarboxylic or dicarboxylic acid reagent onto selectively hydrogenated block copolymers of vinyl aromatic hydrocarbons and conjugated dienes as described above. The reaction between the carboxylic acid reagent in the graft block copolymer can be effected in solutions or by a melt process in the presence of a free radical initiator.

The preparation of various selectively hydrogenated block copolymers of conjugated dienes and vinyl aromatic hydrocarbons which have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference. U.S. Pat. No. 4,795,782 describes and gives examples of the preparation of the grafted block copolymers by the solution process and the melt process. U.S. Pat. No. 4,578,429 contains an example of grafting of Kraton G1652 (SEBS) polymer with maleic an hydride with 2,5-d imethyl-2,5-di (t-butylperoxy) hexane by a melt reaction in a twin screw extruder. (See Col. 8, lines 40–61.)

Examples of commercially available maleated selectively hydrogenated copolymers of styrene and butadiene include Kraton FG1901X, FG1921X, and FG1924X from Shell, often referred to as maleated selectively hydrogenated SEBS copolymers. FG1901X contains about 1.7% bound functionality as succinic anhydride and about 28% of styrene. FG1921X contains about 1% of bound functionality as succinic anhydride and 29% of styrene. FG1924X contains about 13% styrene and about 1% bound functionality as succinic anhydride.

Useful block copolymers also are available from Nippon Zeon Co., 2-1, Marunochi, Chiyoda-ku, Tokyo, Japan. For example, Quintac 3530 is available from Nippon Zeon and is believed to be a linear styrene-isoprene-styrene block copolymer.

Emulsion and solvent-based acrylic based PSAs are known and described in, for example, U.S. Pat. No. 5,639,811 and 5,164,444, respectively, and these patents are hereby incorporated by reference for such disclosures. When emulsions of the film materials and/or adhesive compositions are used, the water may be removed in an extruder by using the process described and claimed in U.S. Pat. No. 5,716,669 (LaRose et al).

In addition, the adhesive compositions may also contain at least one solid tackifier resin component. A solid tackifier is defined herein as one having a softening point above 80° C. When the solid tackifier resin component is present, the adhesive compositions generally comprise from about 40% to about 80% by weight of a thermoplastic elastomer component and from about 20% to about 60% by weight (or from about 55% to 65% by weight) of a solid tackifier resin component. Conventional solid tackifier resins include hydrocarbon resins, rosin, hydrogenated rosin, rosin esters, polyterpene resins, and other resins which exhibit the proper balance of properties. A variety of useful solid tackifier resins are available commercially such as terpene resins which are sold under the trademark Zonatac by Arizona Chemical Company, and petroleum hydrocarbons resins such as the resins sold under the trademark Escorez by Exxon Chemical Company. Examples of a useful solid tackifier include Escorez 2596, Escorez 1310LC, and Wingtack 95 is a synthetic tackifier resin available from Goodyear, Akron, Ohio.

The adhesive compositions may also contain a liquid rubber, Liquid rubber are those rubbers which are liquid at room temperature. The liquid rubbers generally will have an Mw of at least 5,000 and more often at least 20,000. Incorporation of liquid rubbers in amounts of less than 10%, and even less than 5% by weight based on the overall weight of the adhesive formulation results in adhesives which is coextrudable with the polymeric core materials. Liquid block copolymers such as liquid styrene-isoprene block copolymers are particularly useful. Examples of commercially available rubbers include Kraton LVSI-101, available from the Shell Chemical Company, and Isolene D-400 from Elementis Performance Polymers, Belleville, N.J.

In another embodiment, the second skin layer is a heat seal layer. The heat seal layer is generally composed of a heat activatable material. These include polyolefins (linear or branched); polyamides such as nylon; polyester copolymers; polyurethanes thermoplastic adhesives including polyurethane polyesters and polyurethane polyethers; ionomers based on sodium or zinc salts of ethylene methacrylic acid; polyacrylonitriles; and ethylene-vinyl acetate copolymers. Another useful heat-activatable adhesive is an unsaturated polyester having a heat-activated curing agent such as a blocked isocyanate. Included in the group of ethylenevinyl acetate copolymers are the acrylates such as ethylene methacrylic acid, ethylene methyl acrylate, ethylene acrylic acid and ethylene ethyl acrylate. Also, included in the group of useful adhesives are polymers and copolymers of olefin monomers having, for example, 2 to about 12 carbon atoms, and in one embodiment 2 to about 8 carbon atoms. These include the polymers of alpha-olefins having from 2 to about 4 carbon atoms per molecule. These include polyethylene, polypropylene, poly-1-butene, etc. An example of a copolymer within the above definition is a copolymer of ethylene with 1-butene having from about 1 to about 10 weight percent of the 1-butene comonomer incorporated into the copolymer molecule. The polyolefins include amorphous polyolefins. The polyethylenes that are useful have various densities including low, medium and high density ranges as defined above. The ethylene/methyl acrylate copolymers available from Chevron under the tradename EMAC can be used. These include EMAC 2260, which has a methyl acrylate content of 24% by weight and a melt index of 2.0 grams/10 minutes @ 190EC, 2.16 Kg; and EMAC SP 2268T, which also has a methyl acrylate content of 24% by weight and a melt index of 10 grams/10 minutes at 190° C., 2.16 Kg. Polymer film materials prepared from blends of copolymers or blends of copolymers with homopolymers are also useful. The heat-activatable layer may contain ultraviolet (UV) light absorbers or other light stabilizers. These additives are included to prevent degradation due to sunlight. One useful type of stabilizer is a hindered amine light stabilizer, including those previously described.

In one embodiment of the present invention, the heat-activatable adhesive layer comprises a polyurethane adhesive that is the reaction product of an organic polyisocyanate such as hexamethylene diisocyanate, toluene diisocyanate, diphenyl diisocyanate, tetramethylene diisocyanate, toluene triisocyanate, trophenylmethyl triisocyanate, polyaryl polyisocyanate and the like, with an active hydrogen-containing compound such as those containing hydroxyl and/or amino groups exemplified by glycols, polyols, hydroxylated polyesters, diamines and the like. The polyurethane adhesive may contain an adhesion promoting agent selected from the N-substituted-2-pyrrolidone and ethoxylated alkyl phenol.

In another embodiment of the present invention, the heat-activatable adhesive layer is a linear saturated polyester polymer that includes a heat activating curing agent. The uncured polyester itself is a linear alkyl saturated polyester formed by reacting a glycol with a diacid. The molecular weight of the uncured polyester polymer must be low enough to flow and wet the surface of the substrate at application temperature, i.e., generally about less than 400 degrees F. In one embodiment, the molecular weight is in the range of about 5,000 to about 30,000, and in another embodiment, the molecular weight is in the range of about 10,000 to about 15,000. The polyester adhesive includes a heat activated curing agent, such as a heat activated polyisocyanate curing agent. Suitable diols include ethylene glycol, propylene glycol, 1,3-propane diol, 1,4-butane diol, 1,5-pentane diol, 1,6-hexane diol, 1,8-octane diol, 1,4-cyclohexanedimethol, 1,3-cyclohexanedimethanol, diethylene glycol and the like. Useful diacids for making these polymers include aromatic dicarboxylic acids having no vinyl saturation such as isophthalic acid or anhydride, phthalic acid or anhydride, terephthalic acid or aliphatic dicarboxylic acids such as adipic acid, succinic acid, gluteric acid and the like.

The heat activated curing agent acts to cure the polyester upon heating. The heat activated curing agent can be an isocyanate curing agent, preferably a blocked isocyanate curing agent. Suitable such curing agents include phenol blocked methylene bis-4-phenylisocyanate such as those disclosed in U.S. Pat. No. 3,307,966 and phenolaldehyde blocked polyisocyanates such as those discussed in U.S. Pat. No. 3,226,276. Other blocked isocyanates include dimerized toluene diisocyanates and methylethyl-ketoxime blocked isocyanates. A useful adhesive is Bostik adhesive 10-300-3, which is a thermosetting linear saturated polyester adhesive using an isocyanate curing agent and a polyester formed form ethylene glycol and methylterphthalic acid. The blocked isocyanate/uncured linear polyester is dissolved in methylethyl ketone and methylene chloride and has a weight average molecular weight of 10,000 to 15,000.

In one embodiment, the multilayer article comprises a single skin layer on one surface of a core. In another embodiment, the multilayer article comprises two skin layers on each of the core's surfaces. In this embodiment, one of the skin layer is an adhesive layer, such as a pressure sensitive adhesive layer. A releasable liner may be present on the pressure sensitive adhesive to protect the adhesive. In another aspect of this invention, the core second skin layer is a heat seal layer. In another aspect of this invention, the core layer has a skin layer on each of its surfaces. The second skin layer is non-adhesive. In this embodiment, another adhesive or heat seal layer may be placed on the second skin layer. Additionally, in all of the above embodiments, the core may be attached to the skin layers directly, such as when they are coextruded. The core may be attached to the skin layer through an intermediate adhesive layer. This layer may be composed of the above adhesives or heat seal materials. This layer may also be a tie layer. The tie layer acts to promote adhesion between the core and the skin layer. These include DuPont Elvax 3170 and 3190LG. The adhesive resins available from DuPont under the tradename Bynel can also be used. These include ethylene/vinyl acetate resins available under the trade designation Series 1100, acid-modified ethylene acrylate polymers (Series 2000), anhydride-modified ethylene acrylate copolymers (Series 2100), anhydride-modified ethylene/vinyl acetate copolymers (Series 3000), acid- and acrylate-modified ethylene/vinyl acetate resins (Series 3100), anhydride-modified ethylene/vinyl acetate copolymers (Series 3800), anhydride-modified ethylene/vinyl acetate resins (Series 3900), anhydride-modified high density polyethylene resins (Series 4000), anhydride-modified linear low density polyethylene resins (Series 4100), anhydride modified low density polyethylene resins (Series 4200), and anhydride modified polypropylene resins (Series 5000). Bynel CXA 1123, an ethylene/vinyl acetate copolymer having a melting point of 74.degree. C., and Bynel CXA 3101, an ethylene based polymer containing ester and acidic comonomer functionality and having a melting point of 87.degree. C., can be used.

The multilayer articles may be prepared by lamination of the layer or extrusion of the layers, including coextrusion. In one embodiment, the multilayer article is prepared using three extruders were used. Extruders are referred to as A, B, and, C where A represents the ink adhesion promoting polymer, B represents the polymeric core, and C represents the second skin layer. Each temperature of the extruders in matched roughly to the melt temperature of the respective resins loaded in that particular extruder. The temperatures of the extruders is as follows:

A extruder, 350–500 degrees F.
B extruder, 350–550 degrees F.
C extruder, 325–450 degrees F.

Head pressures associated with an extrusion process of this nature are typically in the 1,000 to 5,500 psi range, but vary according to design, polymer type, and process conditions. The extruders feed into a combining unit before proceeding to a slot die, where the respective polymer streams are fed as a melt and combined into the desired layers (ie 2,3, etc. layer structures.) The melt exits the slot die at a nominal thickness higher than that desired of the base film. The volumetric flow rate of the polymer melt of the resin relative to the speed of the cooled cast roll is the mechanism that is used to control the final film thickness.

In line, there are knives that cut a small section of film (usually 2–6 inches) from the outer edges to give neat, trim edges to the film. This film is eventually self wound onto a core in roll form.

The following example illustrate the multilayer articles of the present invention. All the examples are prepared by coextrusion of the various layers as described above.

EXAMPLE A

A two layer article is prepared by coextruding the skin layer of Ex 5 with a polymeric core composition comprising 50% by weight propylene copolymer (3.7% ethylene), 30% TiO2 concentrate comprising 30% TiO2 and 70% ethylene-methacrylate carrier), and 20% calcium carbonate concentrate. The thickness of the layers are 10% for the skin layer and 90% for the core layer.

EXAMPLE B

A three layer article is prepared by coextruding the skin layer of Ex 5, the core of Example A and a second skin layer comprising 50% propylene homopolymer and 50% ethylenevinylacetate (18% vinyl acetate). The layer thickness are 10% for each skin layer and 80% for the core layer.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A polymer film useful as a skin layer for synthetic paper or a label comprising (A) about 50% to about 65% by weight of at least one filler (B) a carrier polymer and (C) a minor amount of an ink adhesion improving polymer, wherein the polymer film has a 60° gloss rating of less than about 40.

2. The film of claim 1 wherein (A) is an inorganic powder.

3. The film of claim 1 wherein (A) is calcium carbonate, titanium dioxide, clay, diatomaceous earth, talc, mica, barium sulfate, aluminum sulfate, silica, or mixtures of two of more thereof.

4. The film of claim 1 wherein (B) is a polyolefin, thermoplastic polymers of ethylene and propylene, a polyester, a polycarbonate, a styrene derived polymer, a polyurethane, a polyacryl, a polymethacryl, a polyvinyl alcohol, a polyamide, a polyimide, a polysulfone, a polymethylpentene, a polyacetal, a vinyl halide derived polymer, a poly(ethylene vinyl alcohol), a vinyl acetate derived polymer, an ionomer, or mixtures of two or more thereof.

5. The film of claim 1 wherein (B) is a polyolefin or a thermoplastic polymer of ethylene or propylene, or mixtures of two or more thereof.

6. The film of claim 1 wherein (C) is a polyolefin, thermoplastic polymer of ethylene and propylene, a polyurethane, a polyvinyl alcohol, a vinyl acetate homopolymer, co- or terpolymer, an ionomer, or mixtures of two or more thereof.

7. The film of claim 1 wherein (C) is a polyolefin or a thermoplastic polymer of ethylene or propylene, or mixtures of two or more thereof.

8. The film of claim 1 wherein (C) is polyethylene, polypropylene, thermoplastic copolymer of ethylene or propylene, or mixtures of two or more thereof.

9. A polymer film useful as a skin layer for synthetic paper or a label comprising (A) about 50% to about 65% by weight of at least one inorganic filler, (B) a carrier resin and (C) a minor amount of an ink adhesion improving polymer comprising polyolefin, thermoplastic polymer of ethylene or propylene, or mixtures of two or more thereof, wherein the polymer film has a 60° gloss rating of less than 40.

10. A multilayer article useful as a synthetic paper or label comprising a polymeric core layer having a first and second surface and at least one skin layer on the first surface of the core layer, wherein the skin layer comprises (A) about 50% to about 65% by weight of at least one filler (B) a carrier polymer and (C) a minor amount of an ink adhesion improving polymer, wherein the skin layer has a 60° gloss rating of less than 40.

11. The film of claim 10 wherein (A) is an inorganic powder.

12. The film of claim 10 wherein (A) is calcium carbonate, titanium dioxide, clay, diatomaceous earth, talc, mica, barium sulfate, aluminum sulfate, silica, or mixtures of two of more thereof.

13. The film of claim 10 wherein (B) is a polyolefin, thermoplastic polymer of ethylene and propylene, a polyester, a polycarbonate, a styrene derived polymer, a polyurethane, a polyacryl, a polymethacryt, a polyvinyl alcohol, a polyamide, a polyimide, a polysulfone, a polymethylpentene, a polyacetal, a vinyl halide derived polymer, a poly(ethylene vinyl alcohol), a vinyl acetate derived polymer, an jonorner, or mixtures of two or more thereof.

14. The film of claim 10 wherein (B) is a polyolefin or a thermoplastic polymer of ethylene or propylene, or mixtures of two or more thereof.

15. The film of claim 10 wherein (C) is a polyolefin, thermoplastic polymer of ethylene and propylene, a polyurethane, a polyvinyl alcohol, a vinyl acetate homopolymer, co- or terpolymer, an ionomer, or mixtures of two or more thereof.

16. The film of claim 10 wherein (C) is a polyolefin or a thermoplastic polymer of ethylene or propylene, or mixtures of two or more thereof.

17. The film of claim 10 wherein (C) is polyethylene, polypropylene, thermoplastic copolymer of ethylene or propylene or mixtures of two or more thereof.

18. The article of claim 10 wherein the polymeric core is a polyolefin, thermoplastic polymer of ethylene and propylene, a polyester, a polycarbonate, a styrene derived polymer, a polyurethane, a polyacryl, a polymethacryl, a polyvinyl alcohol, a polyamide, a polyimide, a poly(ethylene vinyl alcohol), a polyacetal, a polysulfone, a vinyl acetate derived polymer, a vinyl halide derived polymer, an ionomer, or mixtures of two or more thereof.

19. The article of claim 10 wherein the polymeric core is a polyolefin, a thermoplastic polymer of ethylene or propylene, or a mixture of two or more thereof.

20. The article of claim 10 further comprising a filler in the polymeric core.

21. The article of claim 20 wherein filler is an inorganic powder.

22. The film of claim 20 wherein the filler is calcium carbonate, titanium dioxide, clay, diatomaceous earth, talc, mica, barium sulfate, aluminum sulfate, silica, or mixtures of two of more thereof.

23. The article of claim 10 further comprising a second skin layer on the second surface of the polymeric core layer.

24. The article of claim 23 wherein the second skin layer is a polyolefin, thermoplastic polymer of ethylene and propylene, a polyester, a polycarbonate, a styrene derived polymer, a polyurethane, a polyacryl, a polymethacryl, a polyvinyl alcohol, a polyamide, a poly(ethylene vinyl alcohol), a vinyl acetate derived polymer, an lonomer, or mixtures of two or more thereof.

25. The article of claim 23 wherein the skin layers are made from the same polymers.

26. The article of claim 23 where the second skin layer is a heat seal layer.

27. The article of claim 23 wherein the second skin layer is a pressure sensitive adhesive layer.

28. A multilayer article useful as a synthetic paper or label comprising a polymeric core layer having a first and second surface and at least one skin layer on the first surface of the core layer, wherein the skin layer for synthetic paper or label comprises (A) about 50% to about 65% by weight of at least one inorganic filler, (B) a carrier resin and (C) a minor amount of an ink adhesion improving polyolefin, thermoplastic polymer of ethylene or propylene, or mixtures of two or more thereof, wherein the skin layer has a 600 gross rating of less than 40.

29. The article of claim 28 wherein the polymeric core is a polyolefin, thermoplastic polymer of ethylene and propylene, a polyester, a polycarbonate, a styrene derived polymer, a polyurethane, a polyacryl, a polymethacryl, a polyvinyl alcohol, a polyamide, a polyimide, a poly(ethylene vinyl alcohol), a polyacetal, a polysulfone, a vinyl acetate derived polymer, a vinyl halide derived polymer, an lonomer, or mixtures of two or more thereof.

30. The article of claim 28 wherein the polymeric core is a polyolefin, a thermoplastic polymer of ethylene or propylene, or a mixture of two or more thereof.

31. The article of claim 28 further comprising a filler in the polymeric core.

32. The article of claim 31 wherein the filler is an inorganic powder.

33. The film of claim 32 wherein the filler is calcium carbonate, titanium dioxide, clay, diatomaceous earth, talc, mica, barium sulfate, aluminum sulfate, silica, or mixtures of two or more thereof.

34. The article of claim 28 further comprising a second skin layer on the second surface of the polymeric core layer.

35. The article of claim 34 wherein second skin layer comprises a polyolefin, thermoplastic polymer of ethylene and propylene, a polyester, a polycarbonate, a styrene derived polymer, a polyurethane, a polyacryl, a polymethacryl, a polyvinyl alcohol, a polyamide, a poly(ethylene vinyl alcohol), a vinyl acetate derived polymer, an jonomer, or mixtures of two or more thereof.

36. The article of claim 34 wherein the skin layers are made of the same polymers.

37. The article of claim 34 where the second skin layer is a heat seal layer.

38. The article of claim 34 wherein the second skin layer is a pressure sensitive adhesive layer.

* * * * *

UNITED STATES PATENT AND TRADEMARK OFFICE
CERTIFICATE OF CORRECTION

PATENT NO.    : 6,951,683 B2
DATED         : October 4, 2005
INVENTOR(S)   : Christopher J. Blackwell It is certified that error appears in the above-identified patent and that said Letters Patent is hereby corrected as shown below:

Column 8,
Line 52, replace "of 197º C.," with -- of 100º C., --.

Column 18,
Line 44, replace "a polymetacryt, a" with -- a polymethacryl, a --.
Line 48, replace "an jonomer, or" with -- an ionomer, or --.

Column 19,
Line 23, replace "an lonomer, or" with -- an ionomer, or --.
Line 39, replace "a 600 gross rating" with -- a 60º gloss rating --.

Column 20,
Line 10, replace "lanomer, or" with -- ionomer, or --.
Line 30, replace "jonomer, or" with -- ionomer, or --.

Signed and Sealed this

Thirty-first Day of January, 2006

JON W. DUDAS
*Director of the United States Patent and Trademark Office*